United States Patent
Dottax et al.

(10) Patent No.: US 10,984,080 B2
(45) Date of Patent: Apr. 20, 2021

(54) METHOD FOR AUTHENTICATING A USER AND A SECURE MODULE, ASSOCIATED ELECTRONIC APPARATUS AND SYSTEM

(71) Applicant: OBERTHUR TECHNOLOGIES, Colombes (FR)

(72) Inventors: Emmanuelle Dottax, Colombes (FR); Philippe Muresianu, Colombes (FR); Michele Sartori, Colombes (FR); Fabien Cordier, Colombes (FR)

(73) Assignee: IDEMIA FRANCE, Courbevoie (FR)

( * ) Notice: Subject to any disclaimer, the term of this patent is extended or adjusted under 35 U.S.C. 154(b) by 112 days.

(21) Appl. No.: 15/538,841

(22) PCT Filed: Dec. 17, 2015

(86) PCT No.: PCT/FR2015/053605
§ 371 (c)(1),
(2) Date: Jun. 22, 2017

(87) PCT Pub. No.: WO2016/102834
PCT Pub. Date: Jun. 30, 2016

(65) Prior Publication Data
US 2017/0351849 A1 Dec. 7, 2017

(30) Foreign Application Priority Data
Dec. 22, 2014 (FR) ...................................... 1463168

(51) Int. Cl.
*G06F 21/32* (2013.01)
*H04L 29/06* (2006.01)
(Continued)

(52) U.S. Cl.
CPC ............ *G06F 21/32* (2013.01); *H04L 9/3231* (2013.01); *H04L 63/0861* (2013.01);
(Continued)

(58) Field of Classification Search
CPC .. G06F 21/32; G06F 21/83; G06F 2221/2103; H04L 9/3231; H04L 63/0861; H04W 12/06
See application file for complete search history.

(56) References Cited

U.S. PATENT DOCUMENTS

| 7,000,110 B1 * | 2/2006 | Terao ..................... H04L 9/3218 380/28 |
| 9,300,660 B1 * | 3/2016 | Borowiec ............. H04L 63/083 |

(Continued)

FOREIGN PATENT DOCUMENTS

EP    2128783    12/2009

OTHER PUBLICATIONS

International Search Report PCT/FR2015/053605 dated Mar. 15, 2016.

(Continued)

*Primary Examiner* — Techane Gergiso
(74) *Attorney, Agent, or Firm* — Nixon & Vanderhye

(57) ABSTRACT

Disclosed is a method for authenticating a user by using an electronic apparatus including an authentication module and a secure module, which includes the following steps: the authentication module transmits a recognition result to the secure module according to a process that allows the authentication module to be authenticated by the secure module; the secure module generates an authentication token by signing, with a private key stored in the secure module, data including data representing at least one feature of the authentication module; and transmitting the generated authentication token. Also disclosed is an associated secure module, electronic apparatus and system.

22 Claims, 3 Drawing Sheets

Figure 1:
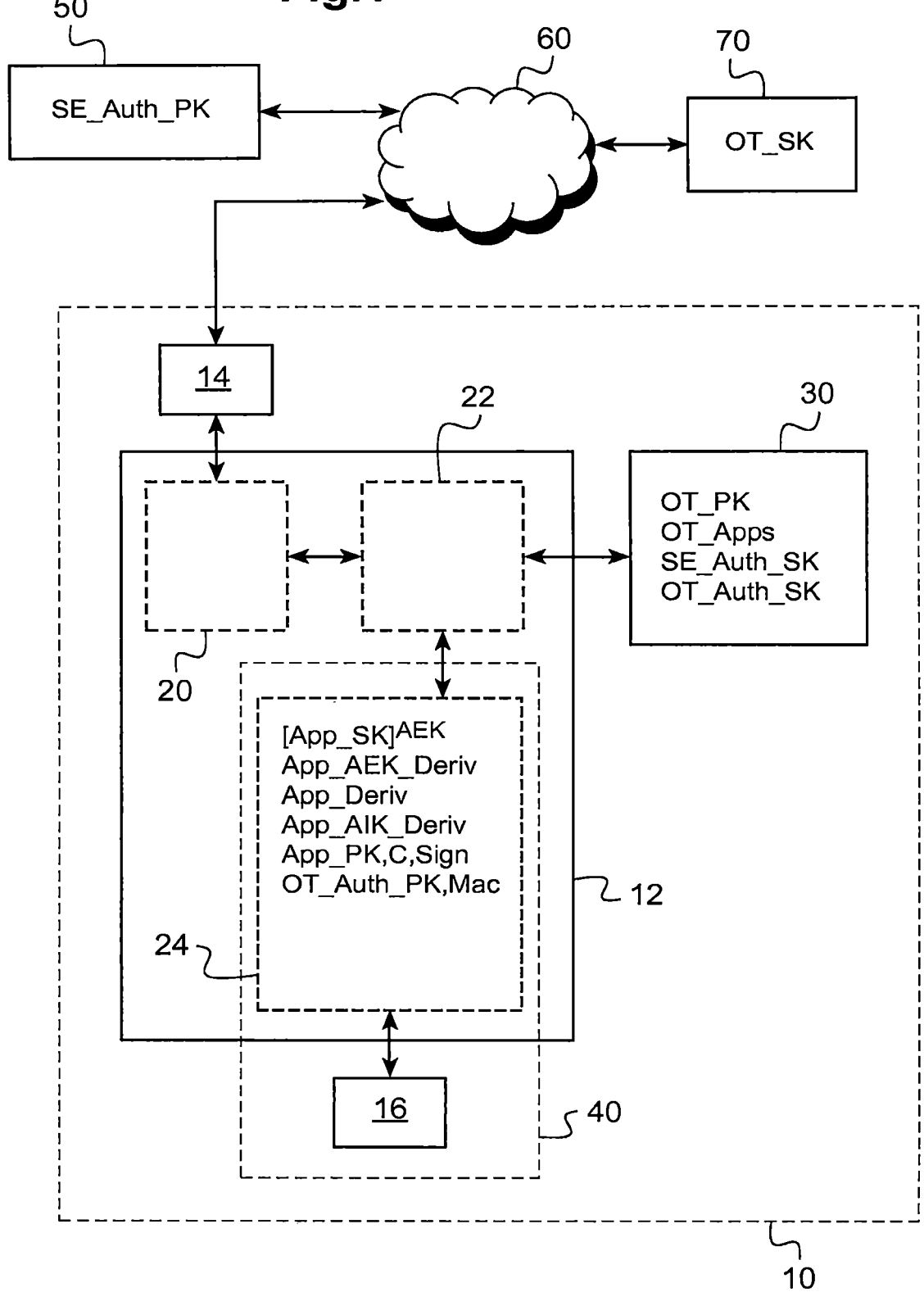

(51) Int. Cl.
*H04L 9/32* (2006.01)
*G06F 21/83* (2013.01)
*H04W 12/069* (2021.01)

(52) U.S. Cl.
CPC ........... *H04W 12/069* (2021.01); *G06F 21/83* (2013.01); *G06F 2221/2103* (2013.01)

(56) References Cited

U.S. PATENT DOCUMENTS

| | | | |
|---|---|---|---|
| 9,736,154 B2* | 8/2017 | Wilson | H04L 63/0884 |
| 9,853,979 B1* | 12/2017 | Roth | H04L 63/10 |
| 9,882,899 B2* | 1/2018 | Cunningham | H04L 9/0877 |
| 2003/0221103 A1* | 11/2003 | Hirota | G06F 21/445 |
| | | | 713/172 |
| 2004/0133781 A1* | 7/2004 | Guillou | H04L 9/3033 |
| | | | 713/170 |
| 2004/0177369 A1* | 9/2004 | Akins, III | H04N 5/913 |
| | | | 725/31 |
| 2010/0217975 A1* | 8/2010 | Grajek | G06F 21/445 |
| | | | 713/157 |
| 2012/0042085 A1* | 2/2012 | Boeszoermenyi | H04L 65/80 |
| | | | 709/228 |
| 2012/0102326 A1* | 4/2012 | Palekar | G06F 21/604 |
| | | | 713/168 |
| 2013/0268444 A1* | 10/2013 | Namgoong | H04L 63/0861 |
| | | | 705/71 |
| 2013/0301830 A1* | 11/2013 | Bar-El | H04L 9/08 |
| | | | 380/210 |
| 2014/0002238 A1 | 1/2014 | Taveau et al. | |
| 2014/0075550 A1* | 3/2014 | Mirashrafi | H04L 63/083 |
| | | | 726/19 |
| 2014/0096212 A1* | 4/2014 | Smith | G06F 21/34 |
| | | | 726/7 |
| 2014/0181959 A1 | 6/2014 | Li et al. | |
| 2014/0189360 A1* | 7/2014 | Baghdasaryan | H04L 63/0861 |
| | | | 713/176 |
| 2014/0195815 A1 | 7/2014 | Taveau et al. | |
| 2014/0289833 A1 | 9/2014 | Briceno et al. | |
| 2015/0163056 A1* | 6/2015 | Nix | H04L 9/0869 |
| | | | 380/46 |
| 2015/0312038 A1* | 10/2015 | Palanisamy | H04L 9/3213 |
| | | | 713/155 |
| 2016/0099927 A1* | 4/2016 | Oz | H04L 63/08 |
| | | | 726/9 |
| 2016/0119291 A1* | 4/2016 | Zollinger | H04L 9/3228 |
| | | | 713/171 |
| 2017/0109509 A1* | 4/2017 | Baghdasaryan | G06F 21/316 |
| 2017/0364911 A1* | 12/2017 | Landrok | G06Q 20/42 |

OTHER PUBLICATIONS

Nok Nok Labs, "Multifactor Authentication", Technical White Paper, Feb. 2014, pp. 1-13.

* cited by examiner

METHOD FOR AUTHENTICATING A USER AND A SECURE MODULE, ASSOCIATED ELECTRONIC APPARATUS AND SYSTEM

TECHNICAL FIELD TO WHICH THE INVENTION RELATES

The present invention relates to the authentication of a user by means of an electronic apparatus.

It relates more particularly to a method for authenticating a user, as well as an associated secure module, electronic apparatus and system.

The invention is applied particularly advantageously in the case where a remote server requests the authentication of the user.

TECHNOLOGICAL BACKGROUND

It is known practice to use an electronic apparatus equipped with an authentication module in order to authenticate a user of the electronic apparatus with an electronic entity requesting such an authentication, for example a remote server communicating with an application executed on the electronic apparatus.

For this, the authentication module performs a recognition (for example biometric) of the user, and, when the result of the recognition is positive, the electronic apparatus transmits an authentication token to the electronic entity requesting the authentication.

OBJECT OF THE INVENTION

In this context, the present invention proposes a method for authenticating a user using an electronic apparatus comprising an authentication module and a secure module, comprising the following steps:
  transmission by the authentication module of a recognition result to the secure module according to a process allowing the authentication of the authentication module by the secure module;
  generation of an authentication token by the secure module by the signing, by means of a private key stored in the secure module, of data comprising data representative of at least one characteristic of the authentication module;
  transmission of the generated authentication token.

Thus, the secure module is assured of the origin of the recognition result and the authentication token contains information relative to the authentication module which has actually generated this recognition result.

Signing of the data should be understood to mean the application of a cryptographic signing algorithm to the data, here using the private key stored in the secure module.

The characteristic of the authentication module which thus forms part of the authentication token is for example an identifier of the authentication module, the type of authentication implemented by the authentication module, a cryptographic key protection method used by the authentication module or a communication method used by the authentication module.

The process allowing the authentication of the authentication module by the secure module uses, for example, a private key of the authentication module.

According to one embodiment that can be envisaged, the process allowing the authentication of the authentication module by the secure module comprises the following steps:
  transmission of a challenge from the secure module to the authentication module;
  generation of a response by the authentication module by the application to the challenge of a signing algorithm using the private key of the authentication module;
  transmission of the response from the authentication module to the secure module;
  checking of the response by the secure module by means of the public key associated with the private key of the authentication module.

As a variant, the process allowing the authentication of the authentication module by the secure module could comprise the setting up of a secure channel between the authentication module and the transmission of the recognition result from the authentication module to the secure module could then be performed via this secure channel.

According to optional features, and therefore nonlimiting features:
  said public key is received by the secure module with an associated signature and the signature is checked by the secure module by means of a key stored in the secure module;
  the recognition result is transmitted signed by means of the private key of the authentication module;
  the authentication method comprises a step of decryption, by the authentication module, of the private key of the authentication module from an encrypted version of the private key of the authentication module;
  said encrypted version is stored in a non-volatile memory of the electronic apparatus;
  the private key of the authentication module obtained by the decryption step is stored in a random access memory of the electronic apparatus;
  the decryption step implements a cryptographic decryption algorithm using a key derived from received data (from a server requesting the authentication or from the secure module) and from data stored in the electronic apparatus;
  said representative data are received by the secure module from the authentication module with an associated signature and the signature is checked by means of a key stored in the secure module;
  the authentication module comprises an authentication sensor;
  the recognition result is determined by the authentication module by comparison between data acquired by the authentication sensor and data stored by the authentication module;
  the authentication module is implemented at least partly by an authentication application run by a processor of the electronic apparatus;
  the electronic apparatus is a cellphone, or a digital tablet;
  the electronic apparatus comprises a holding element on a part of the body of the user (it can for example be a connected watch or connected eye glasses);
  the secure module and the authentication module exchange data by means of a protocol of ISO 7816 or SPI or HCI/SWP type.

The invention also proposes a secure module comprising at least one memory storing a private key and a processor programmed to implement the following steps (for example by virtue of the execution by the processor of instructions stored in the abovementioned memory or another memory of the secure module):
  reception, from an authentication module, of a recognition result according to a process allowing the authentication of the authentication module by the secure module;

generation of an authentication token by the signing, by means of said private key, of data comprising data representative of at least one characteristic of the authentication module;

transmission of the generated authentication token.

According to one possible embodiment, the processor can be programmed to receive said representative data signed, that is to say with an associated signature, from the authentication module and to check the signature of the received representative data by means of a key stored in the secure module.

The processor can also be programmed to implement the process allowing the authentication of the authentication module by the secure module according to the following steps:

transmission of a challenge to the authentication module;
reception of a response from the authentication module;
checking of the response by means of a public key associated with a private key of the authentication module.

The processor can finally be programmed to check a signature of said public key by means of a key stored in the secure module.

The invention further proposes an electronic apparatus comprising an authentication module, a secure module as proposed above, and a control unit storing an application that can be run by a processor of the control unit.

The application is for example a payment application or an access application.

The invention also proposes a system comprising a server and an electronic apparatus as has just been mentioned, in which the electronic apparatus is designed to transmit the generated authentication token to the server and in which the server is designed to receive the transmitted authentication token and to check the received authentication token.

The server can further receive, for example during a preliminary step, data relative to the authentication module from another server. The server can also transmit an authorization or information message to the application in case of verification of the received authentication token.

DETAILED DESCRIPTION OF AN
EXEMPLARY EMBODIMENT

The following description with respect to the attached drawings, given as nonlimiting examples, will give a good understanding as to what the invention consists of and how it can be produced.

Figure 2:
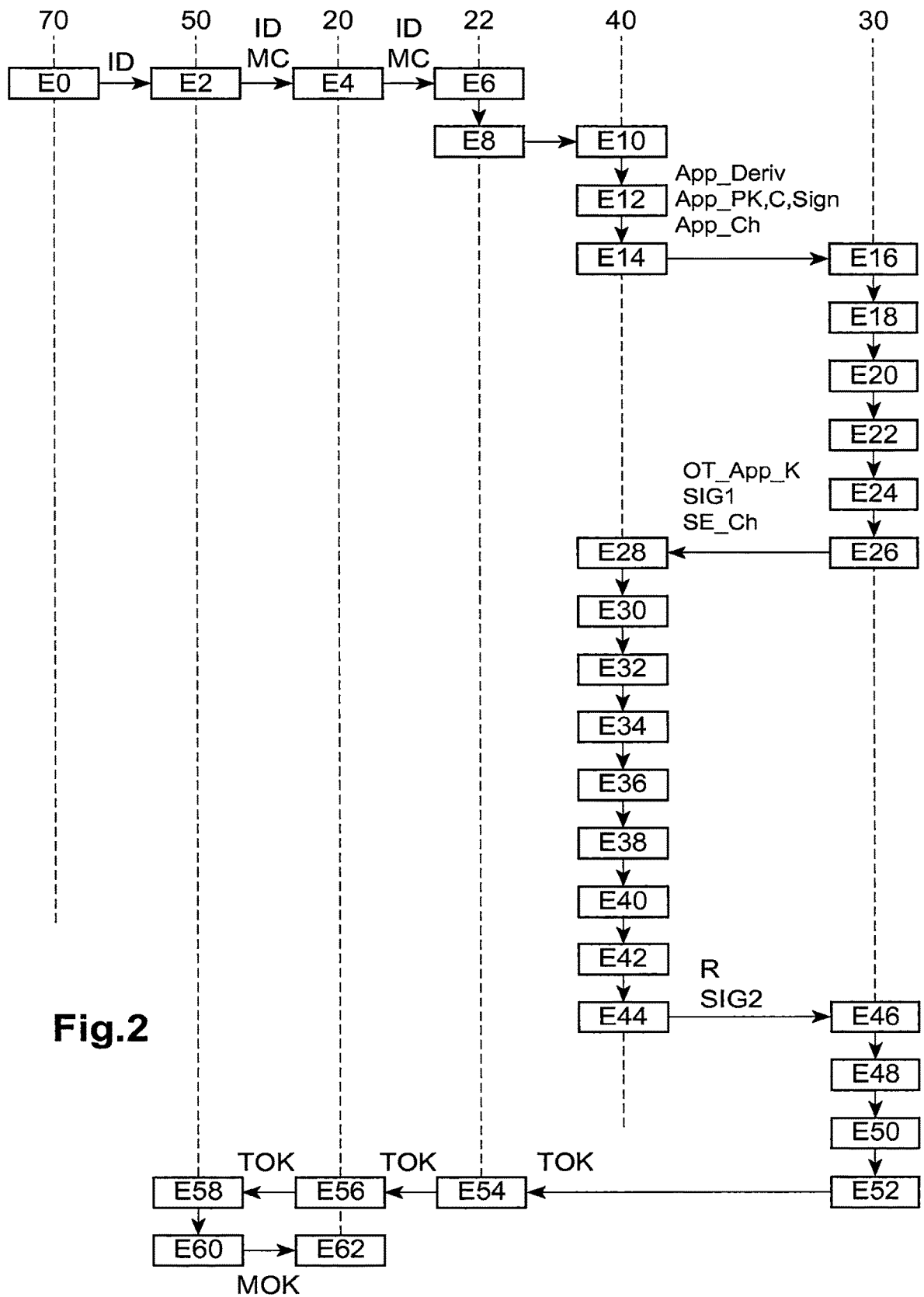
Figure 3:
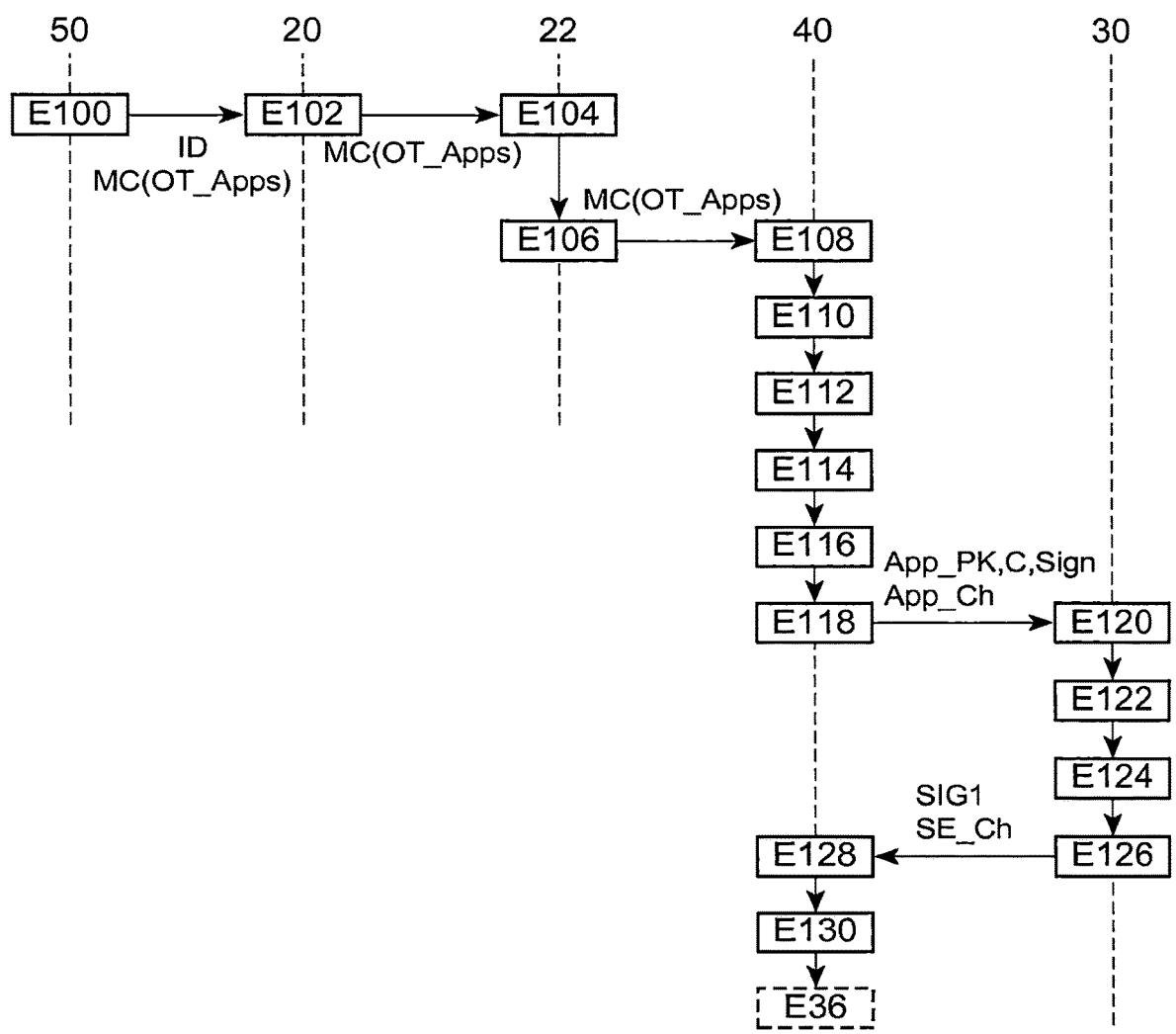

In the attached drawings:

FIG. 1 schematically represents an example of context in which the invention can be implemented;

FIG. 2 represents the main steps of an example of a method for authentication of a user of an electronic apparatus with a server; and FIG. 3 represents the main steps of a variant embodiment of the method of FIG. 2.

FIG. 1 schematically represents an example of context in which the invention can be implemented.

In this example of context, an electronic apparatus 10 (for example a portable telephone (or cellphone), possibly of "smart" type, or "smartphone") comprises a control unit 12, a communication module 14, an authentication sensor 16 and a secure module 30. As a variant, the electronic apparatus could for example be a digital tablet, a connected watch or connected eye glasses. In these latter cases, the electronic apparatus comprises a holding element on a part of the body of the user (for example a bracelet in the case of a connected watch, or temples in the case of connected eye glasses).

The control unit 12 is for example a microcontroller which comprises a processor and memories, such as a random access memory and a rewritable non-volatile memory.

The control unit 12 stores, in at least one of the above-mentioned memories, applications which allow, when they are run by the processor, the implementation by the control unit 12 of methods such as those described below.

These applications notably comprise a client application 20, an authentication coordinator 22 and an authentication application 24.

The client application 20 is for example a payment application or an access application.

When it is run by the processor of the control unit 12, the authentication application 24 cooperates with the authentication sensor 16 in such a way as to form an authentication module 40 used as explained hereinbelow. Such an authentication module 40, or recognition module, is sometimes referred to by the term "recognition factor". It can be a biometric recognition module (for example fingerprint recognition, iris recognition or facial recognition), a voice recognition module or a keypad for inputting a personal code (or PIN). In some embodiments, the authentication module 40 could consist solely of one application, interacting for example with a user interface (touchscreen) for the inputting of a personal code.

In the electronic apparatus 10, the secure module 30 and the authentication module 40 exchange data, for example by means of a protocol of ISO 7816, or SPI, or even HCI/SWP type.

The client application 20 can exchange data, by means of the communication module 14 and a telecommunication network 60, with a server 50 (for example a bank server when the client application 20 is a payment application). Such a server is sometimes referred to as "remote server" because it is accessible via a telecommunication network. When the electronic apparatus 10 is a portable telephone, the telecommunication network 60 for example comprises a cellphone network (notably comprising base stations designed to communicate by radio waves with the communication module 14) and a public information network, such as the internet network. The data can be exchanged by means of protocols of IP, GSM, http and/or https type.

A server of an external authority 70 is also connected to the telecommunication network 60 and can thus exchange data with the server 50 or with the electronic apparatus 10.

In some embodiments that can be envisaged, some of the applications can be run in a trusted execution environment (or TEE), even in another secure module (or secure element) present in the electronic apparatus 10 and possibly associated with the authentication sensor 16.

The secure module 30 is for example an embedded secure element (eSE), for example soldered in the electronic apparatus 10. As a variant, it can be a microcircuit card, for example a cellphone network subscription card (or SIM card, for "Subscriber Identity Module") or a card of UICC ("Universal Integrated Circuit Card") type, or even a secure micro-SD card.

The secure module 30 comprises a processor (for example a microprocessor) and memories, such as a random access memory and a rewritable non-volatile memory.

A non-volatile memory of the secure module 30, for example the rewritable non-volatile memory, stores the following cryptographic keys, which have for example been written into this memory during a phase of personalization of the secure module 30 by the external authority:
- a public key of the external authority OT_PK;
- a root key OT_Apps (that can be used for all the authentication applications prepared by or in collaboration with the external authority);
- a private key for generating an authentication token SE_Auth_SK;
- a private authentication key of the secure module OT_Auth_SK.

Note that these keys are stored encrypted or not in the secure module rendered inaccessible by virtue of its high security level. Thus, the secure module 30 ensures the confidentiality and the integrity of the stored keys.

The server 50 stores the public key SE_Auth_PK associated with the private authentication key of the secure module SE_Auth_SK.

According to a variant that can be envisaged, the private key for generating the authentication token SE_Auth_SK is not written during a personalization phase as indicated above, but generated by the secure module 30 itself during a phase of registration of the authentication module 40 with the server 50.

During this registration phase, it is for example possible to provide for the creation of a secure channel between the secure module 30 and the server 50 (for example after an authentication of identifier-password type, or "login/password"), the generation of the pair of keys SE_Auth_SK/SE_Auth_PK by the secure module 30 and the transmission of the public key SE_Auth_PK to the server 50 via the secure channel.

The authentication application 24, for its part, accesses the following data, stored for example in the rewritable non-volatile memory of the control unit 12:
- a private key of the application App_SK, encrypted by a secret AEK key (and therefore denoted $[App\_SK]^{AEK}$ in the figures);
- a public key of the application App_PK and of the characteristic data C of the authentication module 40, signed by the private key of the external authority OT_SK (corresponding to the abovementioned public key OT_PK), that is to say accompanied by a signature Sign obtained by the application, to the public key of the application App_PK and to the characteristic data C, of a signing algorithm using the private key OT_SK;
- key derivation data App_Deriv, App_AEK_Deriv, App_AIK_Deriv (specific to the application concerned);
- the public key OT_Auth_PK corresponding to the private authentication key of the secure module OT_Auth_SK and a message authentication code Mac obtained by application to the public key OT_Auth_PK of a cryptographic algorithm using a key AIK.

Such data are for example written in the rewritable nonvolatile memory during the installation of the authentication application 24 in the control unit 12. Since these data are not generally stored in a secure module, the sensitive data are stored in encrypted form, as indicated above.

In the example described here, the authentication application 24 is supplied by (or in collaboration with) the external authority and the private key of the application App_SK can thus be encrypted by the derived secrete key AEK (as explained below) from the root key OT_Apps stored in the secure module 30 (also supplied by the external authority).

These data are used as explained below with reference to FIG. 2.

FIG. 2 represents the main steps of a first example of method for authenticating a user of the electronic apparatus 10 with the server 50.

This method is implemented when the server 50 which exchanges data with the client application 20 requests an authentication of the user of the terminal 10.

During a preliminary step E0 (performed for example during the installation of the authentication application 24 in the electronic apparatus 10), the server of the external authority 70 transmits to the server 50 an identifier ID of the authentication module 40 and associated metadata, which represent, for example, characteristics of the authentication module 40.

In the step E2, the server 50 requests, as indicated above, an authentication of the user and thus transmits an authentication request to the client application 20 with which it has previously exchanged data. This authentication request is accompanied by the identifier ID of the authentication module to be used for this authentication and/or of a set of criteria MC ("Match Criteria") defining the possible characteristics of the authentication requested and/or of the authentication module allowing this authentication. The set of criteria MC is for example a list of one or more element(s) each representing a combination of criteria accepted by the server 50 for the authentication of the user, each criterion corresponding to a possible characteristic of an authentication module, for example a type of authentication implemented by the authentication module (by facial recognition, by voice recognition, by iris recognition, by fingerprint recognition, by input of a personal code, etc.), a cryptographic key protection method used by the authentication module (use or not of a trusted execution environment, use or not of a secure module, etc.), a communication method used by the authentication module.

The authentication request is received in the step E4 by the client application 20, which transmits it (with the identifier ID and the set of criteria MC) to the authentication coordinator 22 (step E6).

The authentication coordinator 22 receives the authentication request with the identifier ID and the set of criteria MC and addresses, in the step E8, a recognition request to the authentication module 40 designated by the identifier ID, by checking that this authentication module 40 complies with the criteria defined in the set of criteria MC received with the authentication request. In some embodiments, no identifier is transmitted and the authentication coordinator 22 then sends the recognition request to an authentication module checking at least one of the combinations of criteria defined in the set of criteria MC.

The authentication module concerned 40 (in practice, the authentication application 24) receives the recognition request in the step E10.

According to a variant embodiment different from that described here, it is then possible to set up a secure channel between the authentication module and the secure module, which makes it possible to prevent a passive hacker from having access (by simple observation) to the data exchanged.

To do this, the secure module 30 and the authentication module 40 use, for example, a Diffie-Hellman type scheme, by each generating from their side an ephemeral key, by signing this ephemeral key with their secret key, by checking the signing performed by the other module and, in case of verification, by deducing from these elements a common secret and session keys to be used to encrypt the subsequent exchanges.

In the embodiment described here, the authentication module 40 then generates a challenge App_Ch intended for the secure module 30, for example by random draw (step E12).

The authentication module 40 then transmits, to the secure module 30, the challenge App_Ch, the derivation datum App_Deriv and the public key of the application App_PK (accompanied by the characteristic data C of the authentication module), signed by the private key of the external authority OT_SK, that is to say with the signature Sign mentioned above (step E14).

It will be noted that the exchanges of data are performed here directly between the authentication module 40 and the secure module 30, but could, if necessary, be performed via the authentication coordinator 22 (without the data being processed by the latter).

The secure module 30 receives the challenge App_Ch, the derivation datum App_Deriv, as well as the public key of the application App_PK and the characteristic data C of the authentication module 40, with the signature Sign, in the step E16, and checks the signature Sign of the public key of the application App_PK and of the characteristic data C of the authentication module 40 by means of a cryptographic signature checking algorithm and of the public key of the external authority OT_PK (step E18).

The secure module 30 then generates, in turn, a challenge SE_Ch, for example by random draw, in the step E20.

The secure module 30 then, in the step E22, derives a first derived key OT_App_K by application of a derivation function G to the root key OT_Apps and to the derivation datum App_Deriv:

$$OT\text{App}\_K = G(OT\_\text{Apps}, \text{App\_Deriv}).$$

The secure module 30 generates a signature SIG1 by application, to the challenge App_Ch generated in the step E12 and received in the step E16, of a cryptographic signing algorithm and of the private authentication key of the secure module OT_Auth_SK (step E24).

The secure module 30 transmits, to the authentication module 40, the signature SIG1, the challenge SE_Ch generated in the step E20 and the first derived key OT_App_K (step E26).

The authentication module 40 receives the signature SIG1, the challenge SE_Ch and the first derived key OT_App_K in the step E28.

The authentication module 40 derives, in the step E30, a second derived key AEK by application of a derivation function F to the first derived key OT_App_K and to the derivation datum App_AEK_Deriv (stored in non-volatile memory as already indicated):

$$AEK = F(OT\_\text{App}\_K, \text{App\_AEK\_Deriv}).$$

This second AEK derivation key is equal to the secret key with which was encrypted the private key of the application App_SK stored in the control unit 12 in association with the authentication application 24. (As already indicated, in the embodiment described here, the authentication application 24 has been supplied by or in collaboration with the external authority which has been able to calculate the secret key AEK and to encrypt the private key of the application App_SK with this secret key AEK before installation of the authentication application 24 in the electronic apparatus 10).

Thus, the authentication module 40 can decrypt the private key of the application App_SK using this second AEK derivation key (step E32). The private key of the application App_SK can then be temporarily stored in the random access memory of the control unit 12.

The authentication module 40 then derives, in the step E34, a third derived key AIK by application of the derivation function F to the first derived key OT_App_K and to another derivation datum, here the derivation datum App_AIK_Deriv:

$$AIK = F(OT\_\text{App}\_K, \text{App\_AIK\_Deriv}).$$

The authentication module 40 can thus check, in the step E36, the integrity of the public key OT_Auth_PK by comparing a message authentication code, obtained by application to the public key OT_Auth_PK of a cryptographic algorithm using a key AIK derived in the step E34, and the message authentication code Mac stored in association with the public key OT_Auth_PK in the non-volatile memory of the control unit 12.

If this check is positive, the authentication module 40 can check the signature SIG1 using the public key OT_Auth_PK (step E38), by comparing, for example, the challenge App_Ch generated in the step E12 and the result of the application to the received signature SIG1 of a cryptographic signature checking algorithm using the public key OT_Auth_PK. According to a variant that can be envisaged, the signature SIG1 can be checked by applying, to the challenge App_Ch and to the received signature SIG1, a cryptographic signature checking algorithm using the public key OT_Auth_PK and producing (directly) a positive or negative result.

If the signature SIG1 is correctly verified, this means that the secure module 30 has been correctly authenticated with the authentication module 40.

Naturally, in the case not represented in FIG. 2 wherein one of the two abovementioned checks culminates in a failure, the process of authentication of the user is terminated without the transmission of an authentication token.

In the case where the signature SIG1 is correctly verified in the step E38, the authentication module 40 proceeds, in the step E40, with the recognition of the user, for example by fingerprint recognition, which makes it possible to generate a recognition result R (positive or negative).

The recognition result R is generally determined by the authentication module by comparison between data acquired by the authentication sensor (for example biometric data representative of a suitable part of the body of the user placed facing the authentication sensor) and data stored by the authentication module 40, for example in the rewritable non-volatile memory of the control unit 12. The latter data have for example been stored previously by the authentication module 40 during a learning phase (sometimes called enrollment phase).

The recognition result R obtained in the step E40 and the challenge SE_Ch received in the step E28 are signed by means of a cryptographic signing algorithm and the private key of the application App_SK temporarily stored in random access memory (after which this private key App_SK can be erased from the random access memory), which makes it possible to obtain a signature SIG2 (step E42).

The recognition result R and the signature SIG2 are sent from the authentication module 40 to the secure module 30 (step E44).

The secure module 30 thus receives, in the step E46, the recognition result R and the signature SIG2.

The secure module 30 can then check, in the step E48, the signature SIG2 using the public key of the application App_PK obtained in the step E18, for example by applying this public key App_PK to the signature SIG2 by means of a cryptographic signature checking algorithm and by comparing the result obtained to the recognition result R received and to the challenge SE_Ch generated in the step E20 (and sent in the step E26). According to a variant that can be envisaged, the signature SIG2 can be checked by applying, to the recognition result R, to the challenge SE_Ch and to the received signature SIG2, a cryptographic signature checking algorithm using the public key App_PK and producing (directly) a positive or negative result.

If the signature SIG2 is correctly verified, that means that the authentication module 40 has been correctly authenticated with the secure module 30.

The secure module 30 can thus with certainty associate the characteristic data C of the authentication module 40 received in the step E16 with the authenticated authentication module 40.

The signature SIG2 further makes it possible to ensure that the recognition result R is indeed that transmitted by the authentication module 40.

It will be noted that, in the variant mentioned above in which a secure channel is first of all set up between the secure module 30 and the secure module 40, it is not necessary (but possible however) to proceed with the challenge-response type exchanges which target the mutual authentication of the secure module 30 and of the secure module 40, since the use of the secure channel already allows such a mutual authentication.

When the recognition result is positive, the secure module can consequently generate an authentication token TOK in the step E50, by applying, to a dataset including at least a part of the characteristic data C of the authentication module 40, a cryptographic signing algorithm using the private key generating an authentication token SE_Auth_SK. The authentication token TOK can notably include, in addition to this signature, the characteristic data C of the authentication module 40.

It will be noted that the abovementioned dataset can also include a challenge generated by the server 50 before the step E2 and transmitted with the authentication request from the server 50 to the client application 20 (step E2), then from the client application 20 to the authentication coordinator 24 (step E4), then from the authentication coordinator 24 to the authentication module 40 with the recognition request (step E8), then finally from the authentication module 40 to the secure module 30 in the step E14.

The characteristic data of the authentication module 40 included in the data signed by means of the private key SE_Auth_SK comprise, for example, an identifier of the authentication module and/or a type of authentication implemented by the authentication module and/or a cryptographic key protection method used by the authentication module and/or a communication method used by the authentication module.

The authentication token TOK is then transmitted by the secure module 30 to the authentication coordinator 22 (step E52), then from the authentication coordinator 22 to the client application 20 (step E54), then finally from the client application 20 to the server 50 (step E56).

The authentication token TOK is thus received by the server 50 in the step E58 and can be checked on the server 50 by means of the public key SE_Auth_PK (by, if necessary, taking account of the challenge possibly generated by the server 50 before the step E2 as indicated above), which makes it possible to authenticate the user recognized by the authentication module 40 with the server 50.

The server 50 can also check at that point, that the dataset signed by the secure module 30 (step E50) does indeed include the characteristics C of the authentication module 40 (for example included in the authentication token TOK) and that the latter apply with the criteria defined (before sending in the step E2) in the set of criteria MC. The validity of these characteristics C is guaranteed by their signature by means of the private key SE_Auth_SK stored in the secure module 30.

The server 50 can then transmit, in the step E60, an authorization message MOK (or message informing on the state of authorization) to the client application 20.

The client application 20 receives the authorization message MOK in the step E62 and is thus informed of the success of the user authentication process. The client application 20 can then order the display of a message indicative of the success of the authentication on a user interface (not represented) of the electronic apparatus 10.

In the example which has just been described, the server 50 stores a public key SE_Auth_PK for each authentication module-secure module combination registered with the server 50. To avoid this need for storage, it is possible to provide, according to another possible embodiment, for the secure module 30 to store a certificate comprising the public key SE_Auth_PK (associated with its own private key SE_Auth_SK) and a signature of this public key SE_Auth_PK generated beforehand by a trusted authority (by means of a private key of this trusted authority). The secure module could then transmit this certificate with the authentication token TOK (step E54) and the server could then first of all check the signature of the public key SE_Auth_PK contained in the certificate (by means of a public key of the trusted authority), then the authentication token TOK by means of the public key SE_Auth_PK (as in the step E58).

FIG. 3 represents the main steps of a variant embodiment of the authentication method which has just been described with reference to FIG. 2.

Such a method is implemented in a context of the same type as that of FIG. 1 described above, apart from the following differences:
- the root key OT_Apps is not stored in the secure module 30 but on the server 50;
- the authentication application 24 stores (for example in the rewritable non-volatile memory of the control unit 12) the derivation data App_AEK_Deriv and App_AIK_Deriv, but the derivation datum App_Deriv visible in FIG. 1 is on the other hand not used.

This variant can be used when the authentication application 24 has not been supplied by (or in collaboration with) the external authority having supplied the secure module 30.

During a step E100, the server 50 transmits an authentication request to the client application 20. This authentication request is accompanied by the identifier ID of the authentication module to be used for this authentication and/or by a set of criteria MC ("Match Criteria"), of the same type as described above with reference to FIG. 2 and into which the route key OT_Apps has also been introduced (for example in a dedicated specific field).

The authentication request accompanied by the identifier ID and by the set of criteria MC incorporating the root key OT_Apps is received by the client application 20 in the step E102 and transmitted to the authentication coordinator 22.

The authentication coordinator 22 thus receives the identifier ID and the set of criteria MC incorporating the root key OT_Apps in the step E104.

The authentication coordinator 22 can thus transmit, to the authentication module 40 designated by the identifier ID and/or complying with the criteria defined in the set of criteria MC, a recognition request accompanied by the set of criteria MC incorporating the root key OT_Apps (step E106).

The authentication module 40 receives the recognition request in the step E108 and can thus extract the root key OT_Apps from the set of criteria MC in the step E110.

The authentication module 40 can thus compute in the step E112, the derived key AEK, by application of a derivation function H to the root key OT_Apps (extracted in the step E110) and to the derivation data App_AEK_Deriv (stored in association with the authentication application 24, as indicated above):

$$AEK=H(OT\_Apps,App\_AEK\_Deriv).$$

As in the case of FIG. 2, the derived key AEK has been used previously (before installation of the authentication application 24 in the electronic apparatus 10) to encrypt the private key of the application App_SK.

The authentication module 40 can therefore decrypt the private key of the application App_SK (stored in encrypted form in the non-volatile memory of the control unit 12) by application of a decryption algorithm using the derived key AEK (step E114) and temporarily store the private key of the application App_SK (unencrypted) in the random access memory of the control unit 12.

The authentication module 40 then generates a challenge App_Ch, for example by random draw (step E116).

Then, in the step E118, the authentication module 40 transmits the public key of the application App_PK and the characteristic data C of the authentication module 40, signed by the private key of the external authority OT_SK and therefore accompanied by the signature Sign, as well as the challenge App_Ch.

These data are received by the secure module 30 in the step El 20.

In the step E122, the secure module 30 checks the signature Sign of the public key of the application App_PK and of the characteristic data C of the authentication module 40 by means of a cryptographic signature checking algorithm and of the public key of the external authority OT_PK (stored as indicated in FIG. 1 in the non-volatile memory of the secure module 30).

The secure module 30 then generates a challenge SE_Ch, for example by random draw (step E124).

The secure module 30 generates a signature SIG1 by application to the challenge App_Ch, generated in the step E116 and received in the step E120, of a cryptographic signing algorithm using the private authentication key of the secure module OT_Auth_SK (step E126).

In the step E126, the secure module 30 transmits the signature SIG1 and the challenge SE_Ch generated in the step E124 to the authentication module 40.

The authentication module 40 receives the signature SIG1 and the challenge SE_Ch in the step E128.

Then, in the step E130, the authentication module 40 derives a derived key AIK by application of the derivation function H to the root key OT_Apps extracted in the step E110 and to another derivation datum, here the derivation datum App_AIK_Deriv:

$$AIK=H(OT\_Apps,App\_AIK\_Deriv).$$

The method then continues as indicated above with reference to FIG. 2 from the step E36.

The invention claimed is:

1. A method for authenticating a user using an electronic apparatus that has an authentication module and a secure module, the authentication module including a user-interactive input device that obtains information from the user for verifying an identity of the user, the method comprising steps of:

transmitting, from the authentication module to the secure module, a recognition result obtained from the user-interactive input device, the authentication module also transmitting to the secure module data representative of a type of authentication implemented by the authentication module;

authenticating the authentication module, including the sub-steps of:
 transmitting a challenge from the secure module to the authentication module,
 generating a response by the authentication module by applying a signing algorithm to the challenge using a private key of the authentication module,
 transmitting the response from the authentication module to the secure module, and
 checking the response at the secure module using a public key associated with the private key of the authentication module;

generating an authentication token by the secure module by signing, using a private key of the secure module stored in the secure module, the received data representative of the type of authentication implemented by the authentication module; and transmitting the generated authentication token to an authentication server for authenticating the user, wherein the type of authentication implemented by the authentication module comprises one or more selected from the group consisting of:
 facial recognition,
 voice recognition,
 iris recognition,
 fingerprint recognition, and
 input of a personal code.

2. The authentication method as claimed in claim 1, wherein said representative data are received by the secure module from the authentication module with an associated signature, and
wherein the signature is validated using a key stored in the secure module.

3. The authentication method as claimed in claim 1, wherein said public key is received by the secure module with an associated signature, and
wherein the signature is checked by the secure module using a key stored in the secure module.

4. The authentication method as claimed in claim 1, wherein the recognition result is transmitted signed using the private key of the authentication module.

5. The authentication method as claimed in claim 1, further comprising:
a step of decrypting, by the authentication module, an encrypted version of the private key of the authentication module to obtain the private key of the authentication module.

6. The authentication method as claimed in claim 5, wherein said encrypted version is stored in a non- volatile memory of the electronic apparatus,
and wherein the private key of the authentication module obtained by the decryption step is stored in a random access memory of the electronic apparatus.

7. The authentication method as claimed in claim 5, wherein the decryption step implements a cryptographic decryption algorithm using a key derived from received data and from data stored in the electronic apparatus.

8. The authentication method as claimed in claim 1, wherein the authentication module comprises an authentication sensor, and wherein the recognition result is determined by the authentication module by comparison between data acquired by the authentication sensor and data stored by the authentication module.

9. The authentication method as claimed in claim 1, wherein the authentication module is implemented at least partly by an authentication application run by a processor of the electronic apparatus.

10. The authentication method as claimed in claim 1, wherein the electronic apparatus is a cellphone.

11. The authentication method as claimed in claim 1, wherein the electronic apparatus is a digital tablet.

12. The authentication method as claimed in claim 1, wherein the electronic apparatus comprises a holding element configured to be worn by the user.

13. The authentication method as claimed in claim 1, wherein the secure module and the authentication module exchange data using a protocol of ISO 7816 or SPI or HCI/SWP type.

14. The authentication method as claimed in claim 1, wherein the user-interactive input device comprises one selected from the group consisting of:
   a fingerprint recognition module, an
   iris recognition module,
   a facial recognition module,
   a voice recognition module, and
   a keypad for inputting a personal code.

15. A secure module, comprising:
   a processor and at least one memory in communication therewith, the at least one memory storing a private key of the secure module and program code that, upon execution by the processor, causes the secure module to carry out steps of:
      receiving, from an authentication module, each of:
         a recognition result, and
         a type of authentication implemented by the authentication module,
      the authentication module comprised of a user-interactive input device that obtains information from a user for verifying an identity of the user;
      authenticating the authentication module, via sub-steps of
         transmitting a challenge to the authentication module,
         receiving a response from the authentication module, said response generated from a signing algorithm applied by the authentication module to the challenge using a private key of the authentication module, and
         checking the response using a public key associated with the private key of the authentication module;
      generating an authentication token by signing, using the private key of the secure module, the received data representative of the type of authentication implemented by the authentication module; and
      transmitting of the generated authentication token to an authentication server for authenticating the user,
   wherein the type of authentication implemented by the authentication module comprises one or more selected from the group consisting of:
      facial recognition,
      voice recognition,
      iris recognition,
      fingerprint recognition, and
      input of a personal code.

16. The secure module as claimed in claim 15, wherein the program code further causes the processor to receive said representative data from the authentication module with an associated signature and to check the signature using a key stored in the secure module.

17. The secure module as claimed in claim 15, wherein the program code further causes the processor to check a signature of said public key using a key stored in the secure module.

18. An electronic apparatus, comprising:
   a processor;
   a memory;
   a user-interactive input device;
   an authentication module; and
   a secure module
   wherein the authentication module is in communication with the user-interactive input device and causes the user-interactive input device to obtain information from a user for verifying an identity of the user,
   wherein the secure module comprises the processor and at least one memory in communication therewith, the at least one memory storing a private key of the secure module and program code that, upon execution by the processor, causes the secure module to carry out steps of:
      receiving, from the authentication module, each of:
         a recognition result, and
         a type of authentication implemented by the authentication module;
      authenticating the authentication module, via sub-steps of
         transmitting a challenge to the authentication module,
         receiving a response from the authentication module, said response generated from a signing algorithm applied by the authentication module to the challenge using a private key of the authentication module, and
         checking the response using a public key associated with the private key of the authentication module;
      generating an authentication token by signing, using the private key of the secure module, the received data representative of the type of authentication implemented by the authentication module; and
      transmitting the generated authentication token to an authentication server for authenticating the user,
   wherein the type of authentication implemented by the authentication module comprises one or more selected from the group consisting of:
      facial recognition,
      voice recognition,
      iris recognition,
      fingerprint recognition, and
      input of a personal code.

19. The electronic apparatus as claimed in claim 18, further comprising:
   a control unit, storing an application executable by a processor of the control unit, wherein the application is one of a payment application and an access application.

20. A system, comprising:
   a server; and
   an electronic apparatus,
   wherein the electronic apparatus comprises
      an authentication module, comprised of a user-interactive input device that obtains information from a user for verifying an identity of the user, and
      a secure module, wherein the secure module comprises a processor and at least one memory in communication therewith, the at least one memory storing a private key of the secure module and program code that, upon execution by the processor, causes the secure module to carry out steps of:

receiving, from the authentication module, each of:
- a recognition result, and
- a type of authentication implemented by the authentication module, authenticating the authentication module, via sub-steps of
- transmitting a challenge to the authentication module,
- receiving a response from the authentication module, said response generated from a signing algorithm applied by the authentication module to the challenge using a private key of the authentication module, and
- checking the response using a public key associated with the private key of the authentication module;

generating an authentication token by signing, using the private key of the secure module, the received data representative of the type of authentication implemented by the authentication module; and transmitting of the generated authentication token to an authentication server for authenticating the user, wherein the type of authentication implemented by the authentication module comprises one or more selected from the group consisting of:
- facial recognition,
- voice recognition,
- iris recognition,
- fingerprint recognition, and
- input of a personal code, wherein the electronic apparatus is configured to transmit the generated authentication token to the server and wherein the server is configured to receive the transmitted authentication token and to check the received authentication token.

21. The system as claimed in claim 20, wherein the server is configured to receive data relative to the authentication module from another server.

22. The system as claimed in claim 20, wherein the server is configured to transmit an authorization or information message to the application in case of verification of the received authentication token.

* * * * *